United States Patent [19]
Ebbeson

[11] Patent Number: 5,816,069
[45] Date of Patent: Oct. 6, 1998

[54] SORPTION COOLING UNIT

[75] Inventor: Bengt Ebbeson, Frauenfeld, Switzerland

[73] Assignee: Electrolux Leisure Appliances AG, Frauenfeld, Switzerland

[21] Appl. No.: 809,533

[22] PCT Filed: Sep. 8, 1995

[86] PCT No.: PCT/EP95/03548

§ 371 Date: May 13, 1997

§ 102(e) Date: May 13, 1997

[87] PCT Pub. No.: WO96/08684

PCT Pub. Date: Mar. 21, 1996

[30] Foreign Application Priority Data

Sep. 12, 1994 [DE] Germany .......................... 44 32 4281.6
Mar. 6, 1995 [DE] Germany .......................... 195 07 768.7

[51] Int. Cl.$^6$ .............................. F25B 21/00; F25B 17/08
[52] U.S. Cl. .......................... 62/457.9; 62/235.1; 62/236; 62/480
[58] Field of Search .......................... 62/476, 480, 235.1, 62/236, 457.9, 494

[56] References Cited

U.S. PATENT DOCUMENTS

| | | | |
|---|---|---|---|
| 992,560 | 5/1911 | Heuser | 62/480 |
| 2,167,264 | 7/1939 | Dunz | 62/480 |
| 2,323,902 | 7/1943 | Erland Af Kleen | 62/480 |
| 2,338,712 | 1/1944 | Erland Af Kleen | 62/480 |
| 4,205,531 | 6/1980 | Brunberg et al. | 62/101 |
| 4,686,836 | 8/1987 | Paeye et al. | 62/235.1 |
| 4,744,224 | 5/1988 | Erickson | 62/235.1 |
| 5,038,581 | 8/1991 | Maier-Laxhuber et al. | 62/457.9 |
| 5,186,020 | 2/1993 | Rockenfeller et al. | 62/457.9 |
| 5,388,637 | 2/1995 | Jones et al. | 165/104.12 |
| 5,497,630 | 3/1996 | Stein et al. | 62/112 |
| 5,661,986 | 9/1997 | Labranque | 62/480 |

*Primary Examiner*—William Doerrler
*Attorney, Agent, or Firm*—Perne, Gordon, McCoy & Granger LLP

[57] ABSTRACT

The invention relates to a sorption refrigerating unit in which a liquid is expelled and again absorbed by intermittent heating and cooling of a substance capable of sorption, in a cylinder body. The sorber part is formed by a cylinder body 2 standing in upright position and being closed on all sides, which is penetrated by a heating body 7 protruding from the sorber part with a section serving for heating during the regeneration phase and/or for cooling, respectively, in the cooling phase. The inner space of said sorber part is connected to a evaporizer part 3 via a line 4. Said sorber part and said evaporizer part 3 form a rigid mobile structural unit which together with said evaporizer part can be hung into a refrigerating box 22.

36 Claims, 7 Drawing Sheets

SORPTION COOLING UNIT

BACKGROUND OF THE INVENTION

The invention relates to a sorption refrigerating unit, for a refrigerating box in particular, with a heatable sorber part filled with a substance capable of sorption and sorbing a liquid at standard temperature and again releasing it upon heating.

Such refrigerating units, used in small-size refrigerating apparatus and air coolers of air conditioning apparatus in particular, essentially consist of a sorber part, a condenser and a evaporizer connected to one another by means of a line and forming a closed system. In the sorber part, the substance capable of sorption and being enriched with liquid is heated and therein releases the sorbed liquid in form of vapor. The vapor condenses in the condenser and the condensed liquid accumulates in the evaporizer. If the heat source for the substance capable of sorption is switched off and the substance cools down, the material sucks in the moisture from the line saturated with vapor and therein produces low pressure in the line, causing the liquid in the evaporizer to evaporate and, if required, makes it boil at low temperature. The evaporizer therein withdraws heat from the environment and can be used as cooling member in a refrigerating box.

Refrigerating apparatus of the above-described kind are of simple construction and do not include moving components. As substance capable of sorption for example a zeolite reacting with water in the above-described way can be used. The water herein will boil in the evaporizer also in case of only few degrees or even at negative temperatures because of the low pressure. However, also other sorption substances and liquids are suitable for refrigerating units of this kind, like e.g. salt or ammonia.

When removing the liquid from the substance capable of sorption, it is important that the substance is heated as uniformly as possible. This causes some difficulty in particular in such cases, when heating is effected by a heat source which is to be independent from electrical current, as is the case in refrigerating units, e.g. during camping or on boats. Since the temperature of the flame is very high as compared to the temperature of the heat generated, the important point in a sorber part of the kind in question is that the heat is transferred to the substance capable of sorption such that no local overheating occurs.

Already, a sorption refrigerating unit of the generic kind has been proposed in which the sorber part has an essentially vertical opening of continuous tubular shape in longitudinal direction. The remaining internal space of the sorber part is closed on all sides and its interior is connected to a evaporizer part through a line. A heating element, a spirit burner in particular, is provided for below the tubular opening. After the regeneration phase in which the vapor is expelled from the zeolite under the effect of the heat source and was fed to the evaporizer/condenser through the connecting line, the sorber part is heated to such extent that it must be cooled down. As the sorber is equipped with a double-walled annular cylinder at the inside of the through-opening for the purpose of better heat transfer, which cylinder is partly filled with water evaporated during the regeneration phase, the following problem will arise during cooling down: if e.g. the sorber part is immersed into a cold water bath (e.g. water of a lake) water from the lake will be present in the tubular opening passing through the sorber part. If the lake water now cools down at the inside the double-walled cylinder partly filled with vapor, the vapor in the double-walled annular cylinder will condense at the cooled inner wall and flows down at the inner face. There the water accumulates and again is evaporated by the heated zeolite, the vapor again rising upwardly. This means that continuously vapor is present the in the upper portion of the double-walled annular cylinder and water continuously is present in the lower portion, so that a non-uniform cooling down of the zeolite contained in the sorber part takes place.

A further problem is due to the fact that the inner pipe formed by the double-walled cylinder should be of very thin construction for guaranteeing a good heat transfer. If now the flame of the spirit burner is comparatively large, said inner pipe will be very much heated during heating and softened. As a pressure of about 80 bars can prevail within the double-walled annular cylinder, it may occur that the inner wall of the annular cylinder if compressed flatly so that the flame can no longer leave in upward direction through the cylinder and, therefore, the desired heat distribution across the inner side of the annular cylinder is no longer effected. One could now help oneself by giving the inner pipe of the annular cylinder a particularly strong structure, thus, however, including the disadvantage that the total weight of the sorption refrigerating unit is substantially increased.

SUMMARY OF THE INVENTION

For this reason, the invention is based on the object of improving a sorption refrigerating unit of the generic kind in that respect that an improved heat absorption during the regeneration phase as well as an improved cooling down after this regeneration phase is rendered possible and that with simultaneous structural simplification an improvement in output as compared to the proposed refrigerating unit is guaranteed with simultaneous use of different sources of energy for heating.

Said object in accordance with the present invention is solved in that the sorber part essentially is formed by a cylinder body standing in vertical position and being closed at all sides, which cylinder is passed by a heating body protruding from the sorber part with a section serving for heating in the regeneration phase and/or for cooling down, respectively, in the cooling phase and that the inner space of the sorber part is connected to a evaporizer part through a line.

The sorber part and the evaporizer part are built as rigid mobile structural unit which together with the evaporizer part can be hung into an isolated refrigerating container. Herein, it may for example be a matter of a traditional refrigerating box sealable by a cover or for example an isolated container for liquids, e.g. a milk churn, into which the evaporizer/condenser part is hung. The cylinder body is provided with a heat isolation at its cylinder surface and at the bottom, wherein said isolation can be formed by a glass fiber layer or also by a housing spaced therefrom by means of ribs or the like, in which housing the space between the outer cylinder surface and the housing surface is evacuated or can be filled with a coolant. The upper face of the cylinder body is not provided with a heat isolation, since said surface is charged with the hot burner gases of a heating member in the regeneration phase and/or is directly subjected, respectively, to a coolant (e.g. lake water) during cooling down after the regeneration or expellation phase.

At is upper face the cylinder furtheron in advantageous manner has a hold member serving as grip and/or support member, respectively. Said hold member preferably is built by an annular member supported on the cylinder body through rests, said annular member encircling the part of the heating body protruding from the cylinder body. This hold has the following advantages: by it the cylinder body can be inserted into the hold of a spirit burner during the regeneration phase in which it is rotated by 180° as compared to the cooling phase, wherein the annular member can be used as grip part. The base of the spirit burner is kept at distance by the cylinder body in such way that the flame essentially only flows around the section, protruding from the sorber part, of the heating body. For improved guiding of the flame, the spirit burner has a wind shield reaching until close to the cylinder body and concentrically enclosing it. Furthermore, fastening element, e.g. hooks, are provided for at the outside of the cylinder body, by means of which it can be suspended at the outside of the refrigerating box in such manner that the weight of the cylinder body is absorbed and does not rest on the connection line to the evaporizer located within the refrigerating box. The hooks are distributed and disposed in such way that the cylinder body can be rotated by 180° for the regeneration phase and can be hung to the outside of the refrigerating box together with the evaporizer part.

In advantageous manner, the heating body is built by a closed pipe centrically arranged in the cylinder body and extending over the length thereof, which pipe is evacuated and partly filled with a liquid, with water in particular. The heating body can, however, also be disposed excentrically, if this should be meaningful for saving space. During the heating phase the water is heated by the flame of the burner element such that it is evaporated, wherein the vapor rises upwardly and uniformly distributes the heat across the outer wall of the heating body to the surrounding filling of substance capable of sorption. For the purpose of filing, the tubular heating body at its end protruding out of the sorber part has a sealable filler neck. Furthermore, said free end of the heating body is surrounded by a burner pipe of larger diameter, which is supported at the pipe of the heating body by means of heat conducting ribs. Since bores of stepped size and given arrangement are disposed in the wall of said burner pipe, oxygen is supplied to the flame burning in the burner pipe essentially only in the area of the openings so that the flame is distributed in many smaller flames of shorter range over the burner pipe and there is no direct contact with the cold heating body and thus clean burning without interference is guaranteed. The heat waste gases stream along the upper side not carrying a heat isolation, of the cylinder body and leave through the gap formed between the wind shield of the heating element and the cylinder wall for streaming in upward direction along the cylinder wall subsequently. Since, furtheron, the water present in the heating body due to evaporation uniformly distributes in the heating body, excellent distribution of heat in the interior as well as at the outside of the cylinder body is achievable, so that the water absorbed in the zeolite is expelled from the cylinder quickly and uniformly. In the zeolite, too, the heat is uniformly distributed through heat conducting sheets spread in uniform intervals over the zeolite cross-section.

If after the expellation phase, after which the filing out of the substance capable of sorption is heated, said material is to be cooled down, the entire container can be immersed into lake water, wherein the cylinder body cools down at its outside and also is cooled through the section protruding from the sorber part, of the heating body.

In a further advantageous embodiment of the present invention it can, however, also be provided for that the cylinder body can be suspended in a can-like housing open at its upper side in the regeneration phase as well as in the cooling phase such that it is kept at distance to the can wall and the can bottom by centering elements protruding opposite to the can wall. Below the cylinder body, a heating element can be disposed in the can-shaped housing. In this case, the cylinder body does not have a heat isolation at its outside, so that during the regeneration phase, when the burner is burning, hot air can stream along the outside of the cylinder cooler and the water is expelled from the zeolite. Therein, it is an essential advantage that the heat of the burner is uniformly distributed onto the entire cylinder body by the heating body at the inside and that the hot waste gases of the burner stream along the cylinder body at the outside thereof and heat up the latter, so that no losses in heat occur over the cross-section of the cylinder body, because the temperatures in the central heating means and at the outside of the cylinder body are almost identical. A uniform regeneration of the zeolite thus is guaranteed.

During the cooling phase in which the burner is switched off heat is generated by the absorption of the water in the zeolite, such heat being uniformly distributed by means of ribs annularly distributed around the heating means and being diverted to the outside, so that here an air stream from bottom to top is produced, as in advantageous manner air openings are provided in the lower region of the can-shaped housing. Air from the outside is sucked in through these air openings, which air streams along the outside of the cylinder body and cools it down. As the cylinder body in the above-named preferred embodiment has no isolation, the heat produced in the zeolite can be diverted in upward direction.

A further advantage of the above embodiment of the present invention lies in that during the regeneration phase in which the condenser/evaporizer is not arranged within the refrigerating box, the apparatus has to be lifted out of the box but must only be rotated by not more than 180°. Rather has the can-shaped housing at its upper margin two small sections serving for accommodation of the connecting pipe between the cylinder body and the evaporizer/condenser. The connecting pipe serving as handle has an isolation, since this pipe heats up during the regeneration phase. This isolation at the same time serves as seal for the cutout of the refrigerating box. The can-shaped housing can preferably be made from special steel sheets of 0.6 mm thickness similar to a preserve can, i.e. that the bottom is folded into the rim. The housing can in this way be produced in very budget-priced manner. Aluminum can be used as material, too.

Prior to inserting the evaporizer/condenser into the refrigerating box, i.e. after the regeneration phase, the device is imaged into water e.g., wherein it is held at the upper isolation grip, since the hot cylinder body is not heat isolated at its outside. Since this heat isolation is missing, the outer surface rapidly cools down during immersion into a water bath or into sea water so that the evaporizer can be inserted into the refrigerating box after a cooling period of about 5 to 10 min. The above-described operation, however, only is necessary if the apparatus is to be used for cooling directly after the regeneration phase immediately. If e.g. regeneration is carried out at the weekend after a sailing trip and the apparatus is stored in the container, the evaporizer being arranged out of the refrigerating box, it cools down by itself during the week and then can be immediately again used for a new sailing trip at the weekend. It can be reckoned that after termination of the regeneration phase cooling is completed after 2 to 4 hours so that it can then be used again for cooling.

According to a further advantageous feature of the invention it may be that the connecting line between the sorber part and the evaporizer part is formed by a pipe which on the cylinder-side is arranged in parallel to the axis to the heating body and has openings for the passage of the sorbable liquid and which can be closed by a valve on the evaporizer-side. In the closed position the valve is spring-biased and/or pressure-biased by a valve activation means and can be adjustable manually. If the valve is closed, the cooling operation is interrupted, because the zeolite cannot absorb steam because of the separated connection to the evaporizer/condenser. The valve can be opened by the vapor pressure produced during the regeneration phase against the spring pressure and/or the pressing force of the valve activation means, in particular against the force of the pressure of the ambient air. Therein, the valve activation means in advantageous manner is formed by special steel bellows which on its one side is biased by the pressure present in the connecting line and on the other side by ambient air pressure. For enlarging its surface the evaporation part can additionally show a through bore parallel to the axis which is of such dimensions that e.g. a transitional bottle can be inserted.

As the cylinder cooler and the condenser/evaporizer form a structural unit, it is conceivable that these parts together are insertable into a regeneration means comprising a heat isolated housing part for the cylinder body and a coolable housing part for the evaporizer. The heat isolated housing part therein can comprise a heating element at its lower end, while the coolable housing part can be filled with a coolant enclosing the evaporizer and/or has cooling ribs, respectively, at its outside. After the regeneration phase the structural unit can be removed from the regeneration means, upon which the condenser is inserted into a milk churn e.g. for cooling the milk and the cylinder cooler is inserted into a water container for heating water which can be used as service water e.g. for rinsing milk churns.

According to a further embodiment it is conceivable that the cylinder body at its outside is surrounded by a closed housing and that the hollow space between the cylinder body and the housing can be filled with a cooling agent which can be supplied via a reservoir connected to the housing. Therein, the reservoir can be arranged on the housing in such way that during the regeneration phase the coolant escapes from the housing into the reservoir under the influence of gravity, or in the active cooling phase, respectively, streams from the reservoir into the housing. If namely steam is sorbed by the zeolite, the zeolite heats up increasingly so that the efficiency of the sorption is reduced. For this reason, cooling of the cylinder body is provided for which in the described embodiment can be effected by means of the cooling agent in the housing and in the embodiment described at first by ambient air flowing about the section protruding from the sorber part.

For improving cooling, the housing surrounding the cylinder body can in addition be provided with ribs at the outside thereof which ribs either are placed upon or as formed as hollow housing parts so that the coolant additionally can penetrate into the ribs.

In the regeneration or expellation phase the steam is expelled from the zeolite and guided through a pipe arranged in parallel to the axis to the heating body and having openings for steam passage through the connecting line to the evaporizer. On the evaporizer-side this pipe is equipped with a valve which is biased, spring-biased in particular, in its closed position. The usually closed valve is automatically opened, when the vapor pressure produced in the sorber part during the expellation phase exceeds a given value and is again closed automatically, when said pressure again drops as result of decreasing expellation. The valve furtheron can be adjusted manually for starting the cooling operation in the manner as described in the beginning.

The heating element in advantageous manner can be a burner operated with liquid or gaseous fuel, but can also be a solar device having a paraboloidal-type reflector in the focus of which the section protruding from the sorber part, of the heating body is arranged. In this way, e.g. the inventive sorption refrigerating unit can be used in high-temperature development countries for cooling liquids, milk in particular, wherein it turned out that the milk of about 37° C. can be cooled down to 5° to 7° within comparatively short time (1.5 to 2 hours) in case of an amount of about 17 liters. The advantage of the device in accordance with the present invention lies in the simpleness of its construction, no need for maintenance work and long lifespan due to wear-resistant non-moving parts.

Further advantages, features and particulars of the invention can be seen from the following description of preferred embodiments with reference to the drawings. In the drawings.

LIST OF FIGURES

DETAILED ACCOUNT OF WORKING EXAMPLE OF THE INVENTION

Figure 1:
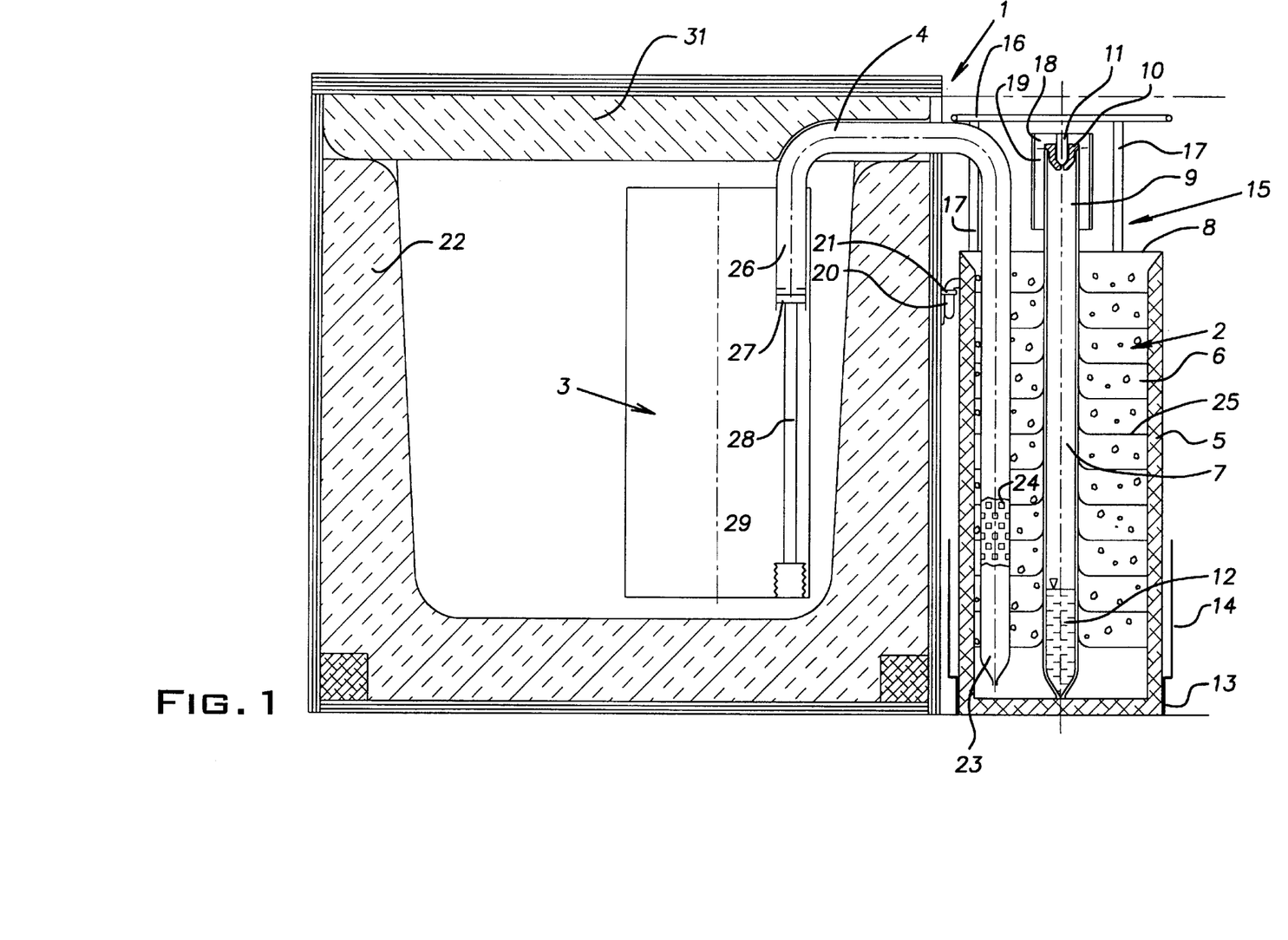
FIG. 1 shows a vertical section through a sorption refrigerating unit in accordance with the present invention, which is suspended in a refrigerating box, the active cooling phase being shown here.

The sorption refrigerating unit shown in FIG. 1 essentially consists of the sorber part formed by the cylinder body 2 and the evaporizer part 3 connected to one another through a connecting line 4. At its cylinder surface and in the bottom area the cylinder body 2 has an isolation 5. The substance capable of sorption, which may be constituted by zeolite 6 e.g., is located within said isolation.

In axial direction of the cylinder body 2, a tubular heating body 7 protruding with a section 9 from the top front face 8 not carrying an isolation, of the cylinder body 2 extends concentrically. At its free end the tubular heating body 7 has a seal 10 including a filling nipple 11 through which the heating body 7 is partly filled with a liquid, water 12 in particular. Apart from that, the tubular heating body 7 is evacuated.

The cylinder body 2 with its lower end is inserted into a burner location 13 having a wind shield 14, this being dealt with lateron.

At it upper surface the cylinder body 2 has a hold 15 essentially being formed by an annular element 16 and rests 17 enclosing the section 9 protruding from the cylinder body 2, of the heating body 7. Said section 9 apart from that comprises a burner pipe 18 of larger diameter, concentrically surrounding said section 9, said pipe being fixed to the section 9 by means of ribs 19.

The cylinder body 2 at its outside carries hook-shaped fixation members 20 by means of which it is fixed in eyes 21 on the outside of the refrigerating box 22.

A pipe 23 merging into the connecting line 4 is disposed in parallel to the heating body 7, the pipe 23 comprising slot-shaped openings 24, shown in FIG. 1 only in sections, for permitting the passage of steam.

Heat conducting sheets 25 are provided for better distribution of heat within the zeolite 6.

The connecting line 4 with a connecting piece 26 ends in the evaporizer 3, the connecting piece 26 at its free end being closed by a valve 27. The valve 27 can be automatically closed through a valve rod 28 and a spring means 29 being built from extendible special steel bellows. The bellows 29 on one side are exposed to the vacuum initially prevailing in the connecting line 4 and on the other side to the ambient air pressure, so that the valve is closed in the beginning. Only when the vapor pressure in the line exceeds the ambient air pressure, the valve opens. Also a operation means (not shown) for the valve is provided for by means of which the valve can be opened manually. The spring pressure and the ambient air pressure are overcome by the vapor pressure forming in the expellation phase in the cylinder body 2 and acting on the valve through the connecting line 4, so that the valve opens as long as the vapor pressure is high enough. If the vapor pressure decreases, the valve closes at a certain threshold value and the apparatus can be stored without cooling function until the refrigerating operation is started by manually opening the valve 27.

Figure 2:
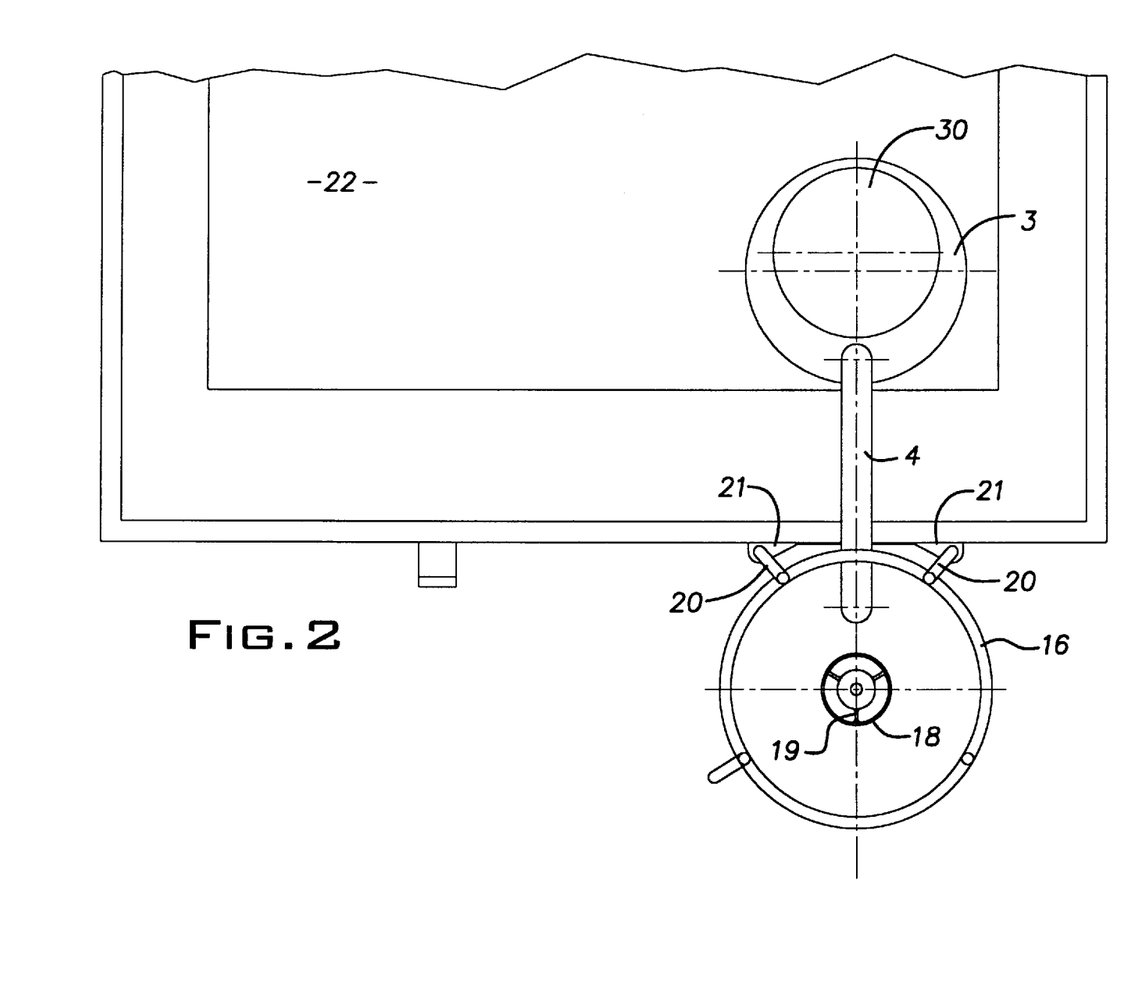
FIG. 2 shows a schematical top view onto the arrangement of FIG. 1.

As can further be seen from FIG. 2, the evaporizer 3 has a comparatively large inside through bore 30 on one hand serving for enlarging the cooling surface of the evaporizer and on the other hand being suitable for accommodating a drinking bottle.

Figure 3:
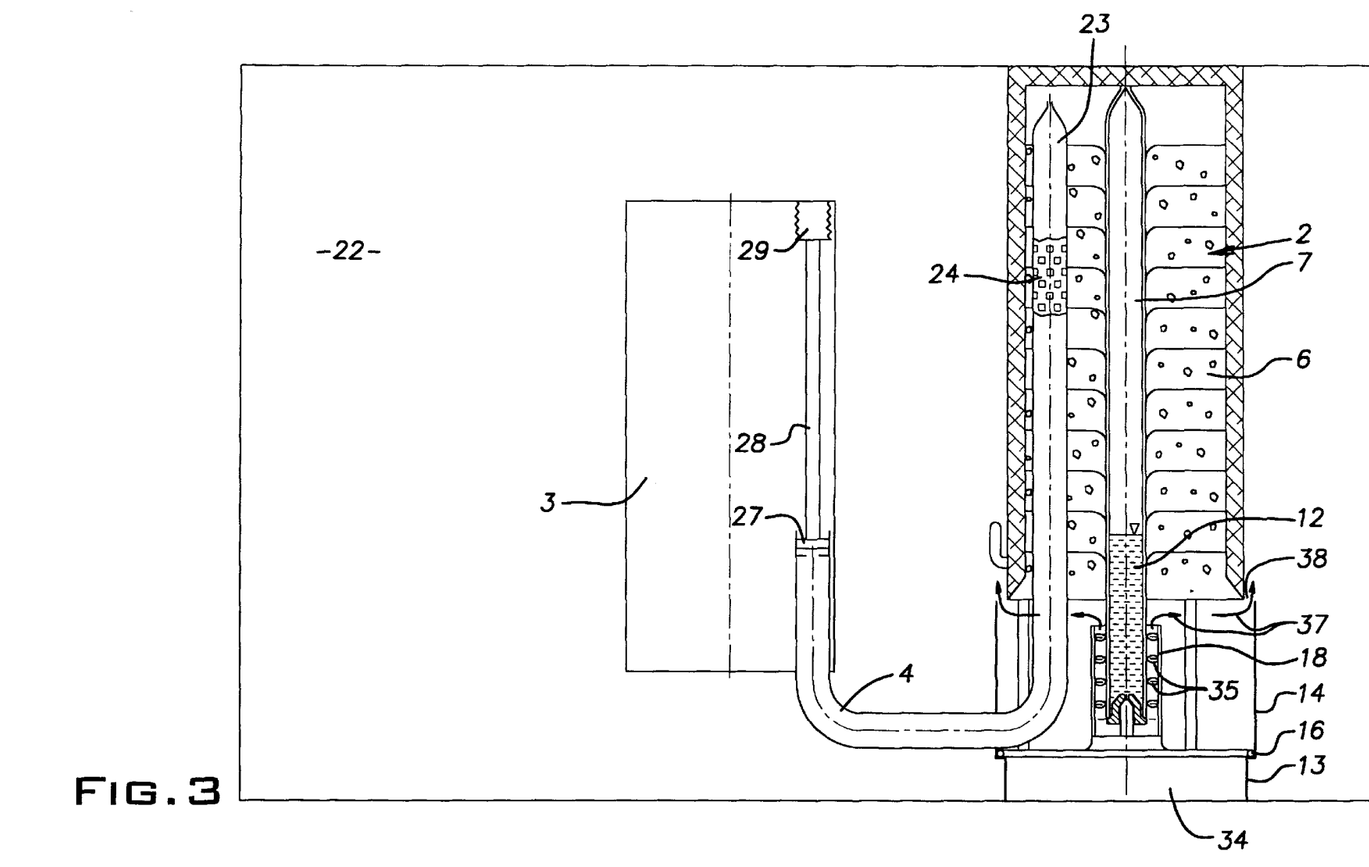
FIG. 3 shows a view of the device in accordance with the present invention in the regeneration/expellation phase, in which the cylinder body and the evaporizer part are disposed out of the refrigerator box.
Figure 4:
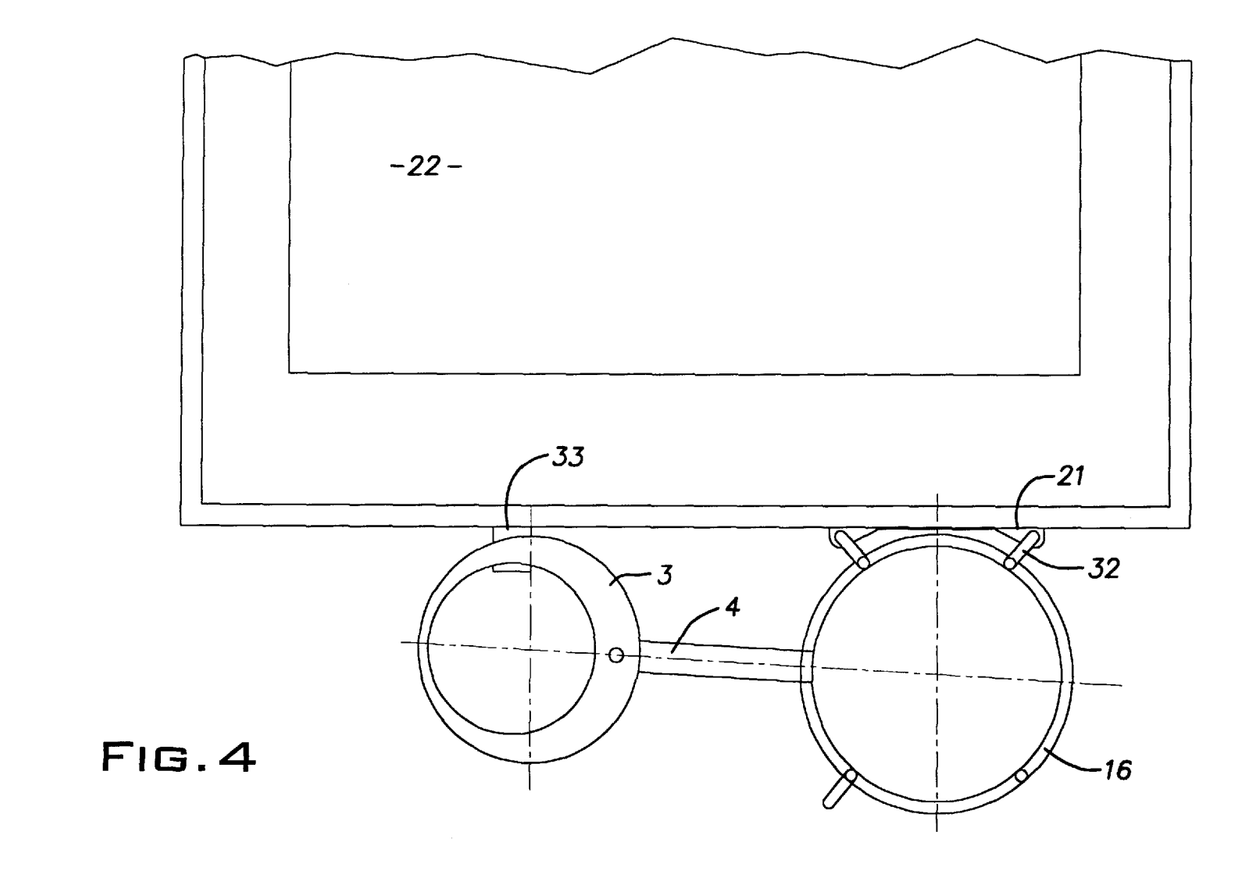
FIG. 4 shows a top view onto the arrangement of FIG. 3.

In the position shown in FIG. 3, the evaporizer 3 has been taken out of the refrigerating box 22 and the sorption refrigerating unit 1 has been rotated by 180°, wherein the annular member 16 is inserted in the burner location 13 and the cylinder body 2 is held in the eye 21 by means of a hook 32, while the evaporizer 3 is received in a hold 33 located at the refrigerating box 22. The burner pipe 18 can now be heated with the aid of a burner 34, the flame 35 surrounds the burner pipe 18.

Figures 5, 10:
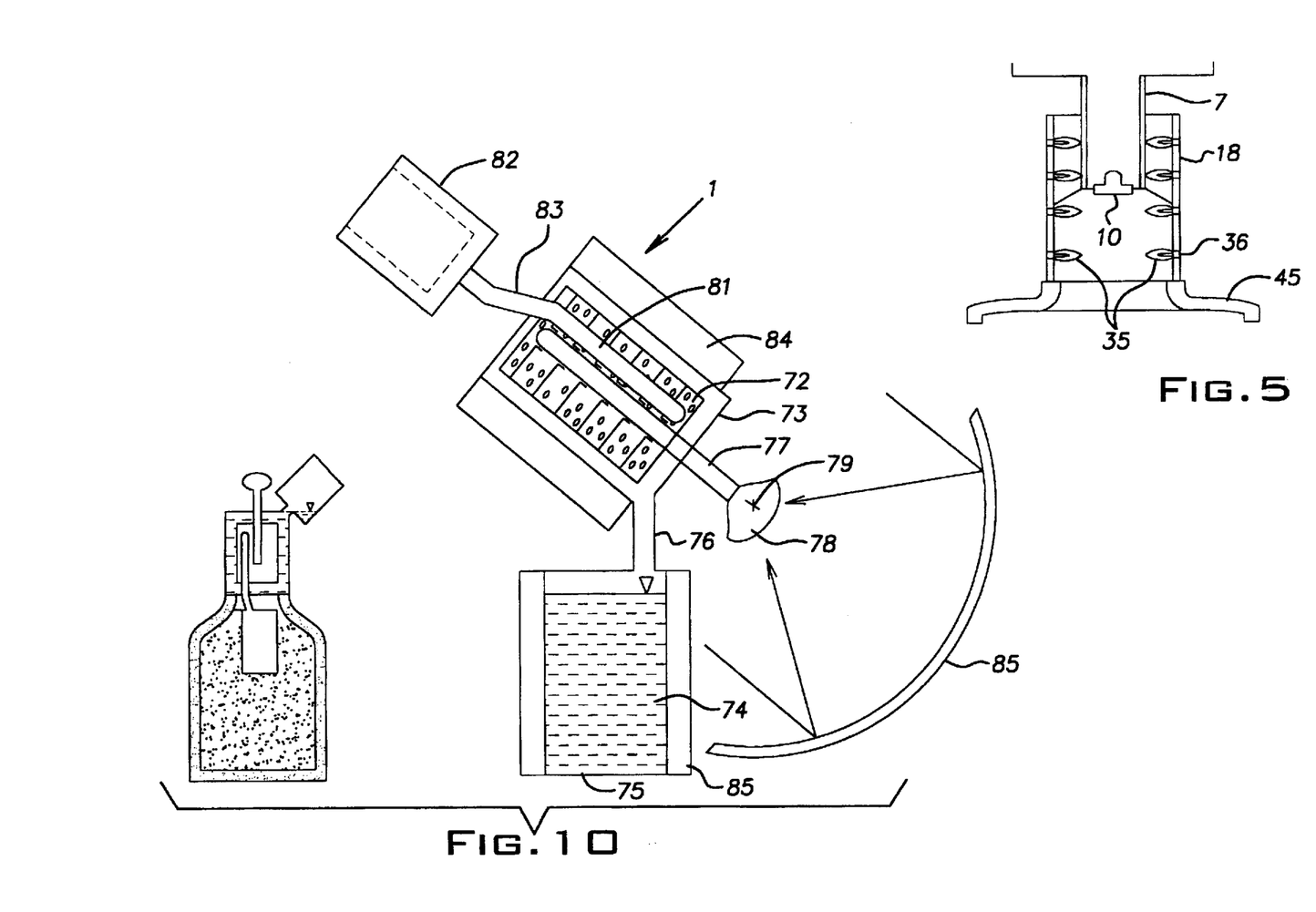
FIG. 5 shows a detail view of a further embodiment for the arrangement and embodiment of the heating element.
FIG. 9 shows the practical use of the sorption refrigeration unit in accordance with the present invention for cooling milk in a milk churn and FIG. 10 shows a further embodiment of the sorption refrigerating unit in accordance with the present invention which has been developed in particular for the development countries for cooling milk and being heatable by solar energy.

A preferred embodiment of the burner section is shown in FIG. 5, wherein the burner pipe comprises several openings 36 spaced over its circumference, through which air is supplied to the inner area of the burner pipe 18 and many small flames come into existence. The advantage lies in that no direct contact occurs between the flame and the cold tubular heating body, so that clean burning is guaranteed.

As can be seen from FIG. 3, the hot exhaust gases 37 stream along the surface 8 of the cylinder body 2 through the slot 38 formed between the wind shield 14 and the cylinder body 2. The cylinder body, therefore, is enclosed by the hot exhaust gases so that a good heat transfer to the substance capable of sorption 6 is guaranteed.

Figures 6, 7:
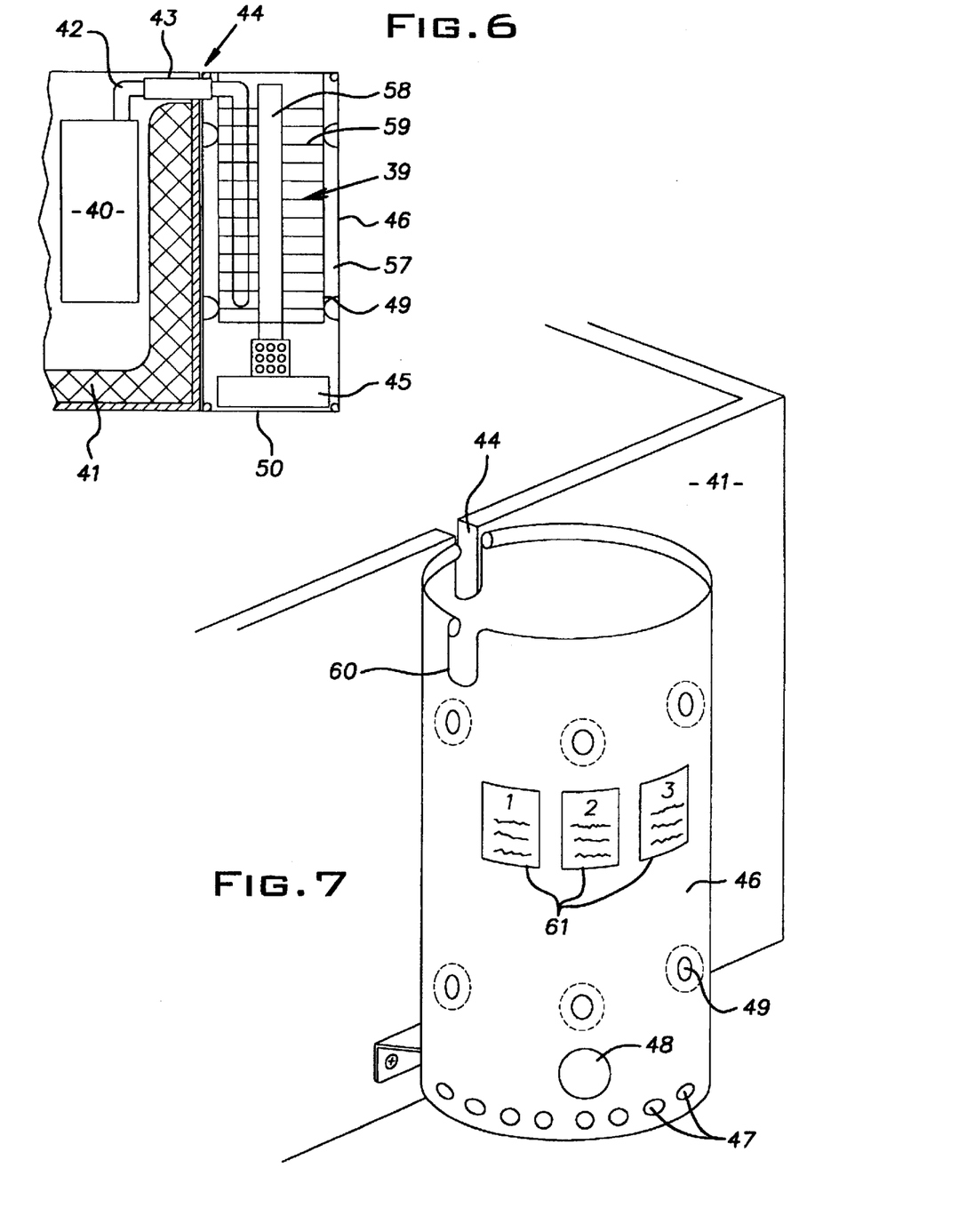
FIG. 6 shows a further embodiment for a sorption refrigerating unit in accordance with the present invention.
FIG. 7 shows the can-shaped housing into which the sorption refrigerating unit can be hung during the cooling or regeneration phase, respectively, without rotating it by 180°.

In the embodiment shown in FIG. 6, the cylinder body 39 and the evaporizer 40 are in cooling phase positions, the evaporizer 40 being hung into a refrigerating box 41. The connecting line 42 is provided with an isolation 43 sealing the slot 44 in the wall of the refrigerating box 41. Simultaneously, said connecting line 42 also serves as holding grip by means of which the unit out of cylinder body 39 and evaporizer 40 can be lifted out of the position shown in FIG. 6. The heating element 45, in this case e.g. a spirit burner, is disposed below said cylinder body 39. The cylinder body 39 and the heating element 45 are received in a can-shaped housing 46 which can be mounted at the outside of the refrigerating box 41 fixedly. Said housing in its lower region has air holes 47 and an ignition hole 48 through which the spirit burner can be ignited. Indentations 49 in the wall of the can-shaped housing 46 serve as centering means holding the cylinder body 39 at a distance from the housing wall and furthermore clamping it.

As can further be seen, the cylinder cooler 39 in this embodiment is arranged in a permanently upright position and the burner 45 is disposed below the cylinder body 39. The metal housing 46 can be made from e.g. one or several special steel sheets of 0.6 mm thickness e.g., the bottom 50 being crimped into the rims of the housing. During the regeneration phase in which the water is expelled from the zeolite by means of the flame from the heating element, combustion air flows through the air holes 47 and the hot exhaust gases stream into the gap 51 between the cylinder body 39 and the wall of the housing 46 upwardly, so that the cylinder body having no heat isolation at its outside is heated uniformly. As heat also is supplied through the heating body 58 in the central area of the cylinder body 39, the heat is distributed uniformly so that no losses in heat occur. Due to the exhaust gases streaming along the outside, additional heat is supplied from the outside so that a very good heat distribution over the cross-section of the cylinder body 39 is achieved and the efficiency of regeneration is improved.

In the cooling phase during which the heating element 45 is switched off, heat is generated by absorption of the water in the zeolite which heat is uniformly distributed through the ribs 59 annularly encircling the central heating body 59, and an air stream in upward direction is produced on the outside, because ambient air is supplied as cooling air through the air holes 47 from bottom and can leave on top on the open side of the housing 46. In contrast to the embodiment under FIGS. 1 to 4, it is no longer required in the embodiment under FIG. 6 that the device is rotated by 180° in the regeneration phase in which the evaporizer is located outside of the box. For this reason a further recess 60 into which the connecting line 42 can be hung is provided for on the upper rim metal housing 46.

In FIG. 7 it is further shown that handling instructions for handling steps 61 are provided for on the outside of the metal housing 46.

Figure 8:
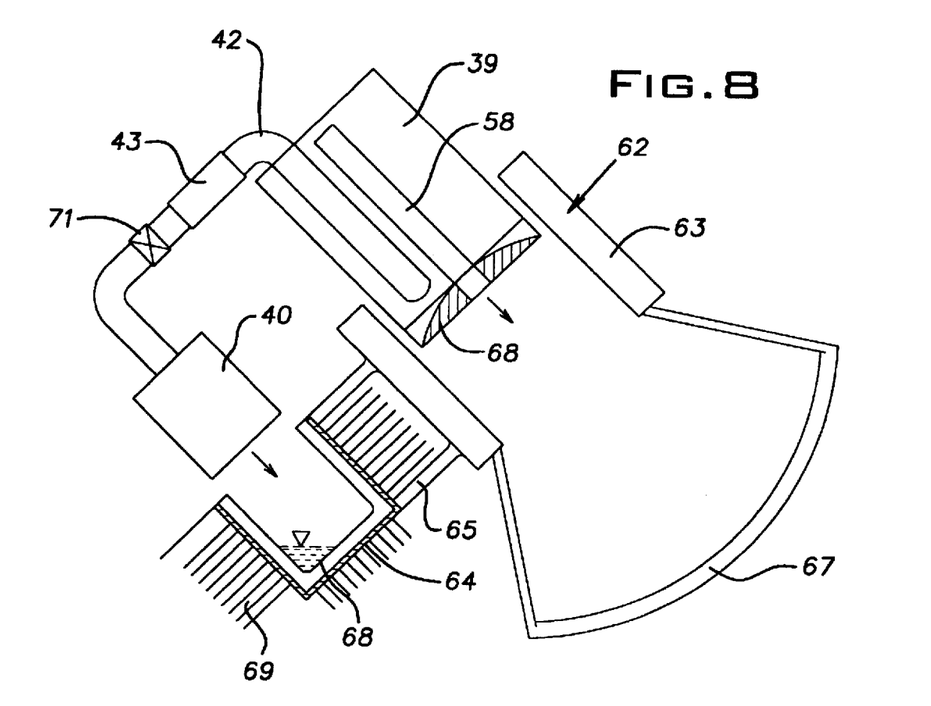
FIG. 8 shows a further preferred embodiment of the sorption refrigerating unit in accordance with the present invention which can be inserted into a regeneration means for regeneration.

The apparatus shown in FIG. 6 can e.g. be inserted into a regeneration apparatus 62 shown in FIG. 8. This regeneration means comprises a heat-isolated housing part 63 for the cylinder body 39 and a coolable housing part 64 for the evaporizer 40. Both housing parts are fixedly connected to one another through traverses 65. A broadened copper plate 66 absorbing radiation energy from the sun focused by a paraboloidal-type reflector 67 is disposed on the lower end of the heating body 58. This copper plate is of flat shape so that it can e.g. also be placed on a hot plate of a kitchen stove.

The condenser/evaporizer 40 is inserted in the housing part 64 whose diameter is somewhat larger than the condenser/evaporizer so that it is easily slidable into the housing part and maybe a gap will be created which e.g. can be filled with cooling water 68. At its outside the housing part 64 has cooling ribs 69.

Figure 9:
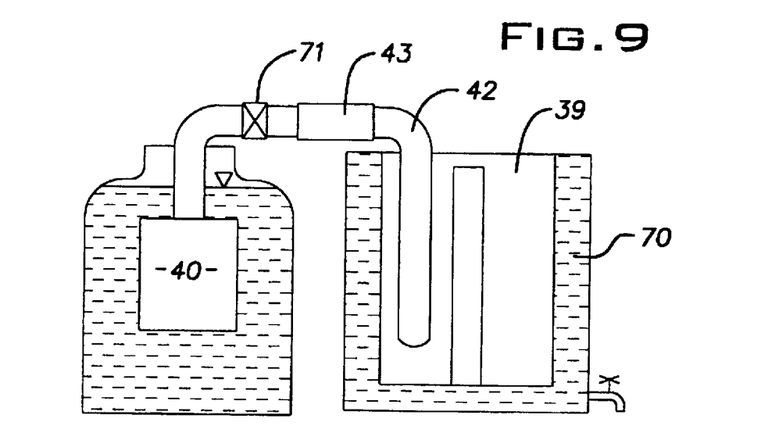

In FIG. 9 the cooling phase of the regenerated apparatus in FIG. 8 is shown, wherein the evaporizer 40 is hung into a mild churn while the cylinder body 39 is hung into a water container 70 so that the heat generated in absorption of water in the zeolite serves for heating service water which can e.g. be used for cleaning milk churns. The valve 71 provided for in the line 42 can be manually operable and interrupt the connection between the evaporizer and the cylinder body 39 so the cooling phase is interrupted, too.

According to a further preferred embodiment shown in FIG. 10, the cylinder body can be surrounded by a housing 73 which is evacuated and can be filled with a cooling agent, e.g. water 74, instead of the isolation. This water 74 is located in a reservoir 75 connected to the housing 73 through a line 76. The heating body 77 at its free end protruding from the cylinder body 72 has a calotte shell shaped thickening 78 which is arranged in the focus 79 of a paraboloidal-type reflector 80 when the sorption refrigerating unit 1 assumes its regeneration position. The cylinder body 72 is connected to the evaporizer 82 via the pipe 81, which evaporizer can e.g. be inserted into an isolated milk churn during the active cooling phase, wherein the cylinder body 72 and the housing 73 seal the milk churn to the top. Similar to the embodiments described in FIG. 1, the evaporizer 82 can of course comprise a valve means automatically closing the connecting line 83 as soon as the vapor pressure in said line drops below a given value.

The housing 73 as well as the reservoir 75 can comprise cooling ribs 84, 85 at its outside, which ribs either are placed onto the outside of the containers as flat members or are of hollow shape so that the cooling agent 74 can flow into the cooling ribs from the inside.

In the following the operating mode of the apparatus in accordance with the present invention is to be described. In FIG. 1 the active cooling phase is shown in which water is located in the evaporizer 3. When the valve 27 is opened, the zeolite disposed in the cylinder body 2 sucks in the moisture from the line 4 saturated with vapor and therein generates low pressure in the line, causing the liquid located in the evaporizer to evaporate and maybe causing it to boil at low temperature. Therein, the evaporizer 3 cools down so that heat is withdrawn from the environment in the refrigerating box 22. The vapor is absorbed by the zeolite, the zeolite heating up therein. For this purpose it has to be cared that the heating temperature of the zeolite does not increase too much, since otherwise the efficiency of the vapor absorption would be reduced. The section 9 protruding from the cylinder body 2, of the heating body 7 with the surface enlarged by the burner pipe 18 serves for cooling, said section being surrounded by ambient air.

If cooling comes to a standstill due to the almost complete absorption of steam in the zeolite 6, the apparatus requires regeneration. For this purpose it is—as such is shown in FIG. 3—removed from the refrigerating box and rotated by 180° and then placed on the burner location 13 of the spirit burner 34. By heating the burner pipe with a suitable heat source now the water absorbed in the zeolite is expelled and again reaches the evaporizer 3 in this case acting as condenser through the slots 24 in the pipe 23 and through the connecting line. Therein, the valve 27 is closed in the beginning until the spring force of the special steel bellows is overcome by the vapor pressure created in the connecting line 4.

The amount of water provided for in the heating body 7 is evaporated with increasing heating of the zeolite 6 in the active cooling phase under FIG. 1, so that the vapor rises into the section 9 and condenses as result of the contact with the cold outer wall of section 9 and again flows down in form of water on the inner wall of the pipe 7, wherein the zeolite in this way can be kept on a lower temperature level.

During the expellation phase under FIG. 3, however, the steam generated during heating and rising in upward direction provides a favorable heat distribution on the zeolite 6 so that the water is uniformly expelled for the zeolite 6.

When the expellation phase under FIG. 3 is finished finally, it is advisable to cool down the sorber part and the evaporizer part, that they again show the low starting temperatures for the subsequent active cooling phase. For this purpose both parts can be immersed into a cooling agent, e.g. water of a lake, wherein the annular member 16 can serve as grip. The latter hardly heated up during the expellation phase, since it is disposed at a larger distance to the flame of the burner. When immersing the cylinder body into lake water, the section 9 of the pipe 7 cools down severely, so that the vapor located in the pipe 7 condenses and flows in downward direction on the inside wall of the pipe 7, wherein the low temperature is uniformly given to the zeolite via the heat conducting sheets 25 until the condensed water in the lower region again evaporates by the zeolite absorbing water and again rises upwardly so that the operation is repeated.

As the evaporizer 3 is closed with respect to the sorber part 2 by the valve 27, the condensed water is kept back in the evaporizer 3 so that the apparatus can be stored for a longer period of time without function. If it is then to be used, the valve 27 can be opened manually so that the circulation starts from the beginning.

List of Reference Numerals 1 sorption refrigerating unit
2 sorber part, cylinder body
3 evaporizer part
4 connecting line
5 isolation
6 zeolite
7 heating body
8 top front surface
9 section
10 seal
11 filling nipple (fitting)
12 water
13 burner location (accommodation)
14 wind shield
15 hold
16 annular member
17 rest
18 burner pipe
19 rib
20 fixation member
21 eye
22 refrigerating box
23 pipe
24 opening 25 heat conducting sheet
26 connecting piece
27 valve
28 valve rod
29 spring
30 through bore
31 cap
32 hook
33 hold
34 burner
35 flame
36 opening
37 waste/exhaust gases
38 slot
39 cylinder body
40 evaporizer
41 refrigerating box
42 connecting line
43 isolation
44 slot
45 heating element
46 housing
47 air hole
48 ignition hole
49 indentation
50 bottom
57 gap
58 heating body
59 ribs
60 recess
61 handling instructions
62 regeneration means
63 housing part
64 housing part
65 traverse (crossbeam)
66 copper plate
67 paraboloidal-type refector
68 coolant water
69 cooling ribs
70 water reservoir
71 valve
72 cylinder body
73 housing
74 water
75 reservoir
76 line
77 heating body
78 thickening
79 focus
80 paraboloidal-type reflector
81 pipe
82 evaporizer
83 connecting line
84 cooling rib
85 cooling rib

I claim:

1. An absorption refrigerating unit for a refrigerator, comprising a heatable absorber part, a heating element, and an evaporator part, the absorber part being formed from a casing (2) filled with a material capable of absorption, said material absorbing fluid at a normal temperature and releasing fluid upon warming and through which passes said heating element (7), said casing (2) having heat insulation (5) on outer surface thereof, said heating element being a closed pipe oriented essentially vertically and centrally within said absorber part and extending over a length of the absorber part, said heating element being evacuated and partially filled with a liquid and having a free end protruding from said casing and said heat insulation effective for heating in a regeneration phase and at least partially cooling in a cooling phase, an interior of the absorber part being connected with the evaporator part (8) via a connecting line (4).

2. An absorption refrigerating unit in accordance with claim 1, wherein the absorber part casing (2) is cylindrical, stands essentially upright, and is closed on all sides.

3. An absorption refrigerating unit in accordance with claim 1, wherein the absorber part (2) and the evaporator part (3) form a rigid mobile component, which may be suspended with the evaporator part in a cooling box (22).

4. An absorption refrigerating unit in accordance with claim 2, wherein the cylindrical casing (2) has heat insulation (5) on its cylindrical surface and bottom but not on its top.

5. An absorption refrigerating unit in accordance with claim 2, wherein a top (8) of the cylindrical casing (2) has a holder (15) serving as a handle and/or support.

6. An absorption refrigerating unit for a refrigerator, comprising a heatable absorber part, a heating element, and an evaporator part, the absorber part being formed from a casing filled with a material capable of absorption, said material absorbing fluid at a normal temperature and releasing fluid upon warming and through which passes said heating element, said heating element being oriented essentially vertically and having a section for heating in a regeneration phase and at least partially for cooling in a cooling phase, an interior of the absorber part being connected with the evaporator part via a connecting line, the section of the heating element for heating in the regeneration phase, and at least partially for cooling in the cooling phase, protruding from the absorber part, the casing being cylindrical, essentially upright, and closed on all sides, a top of the casing having a holder serving as at least one of a handle and a support, wherein the holder (15) has a ring element (16) which is disposed concentric to the axis of the cylinder and attached to the cylindrical casing (2) by means of supports (17), said ring element encloses the free end (9) of the heating element (7) protruding from the cylindrical casing.

7. An absorption refrigerating unit in accordance with claim 6, further comprising a burner holder (13) adapted to receive the ring element (16) inserted into the burner holder (13).

8. An absorption refrigerating unit in accordance with claim 7, wherein the burner holder (13) has a wind screen (14) located concentric to the cylindrical casing (2) of the absorber part and gripping close to the front side of the cylindrical casing.

9. An absorption refrigerating unit in accordance with claim 3, wherein fastening elements (20, 21, 32) are provided on the outside of the casing (2), said fastening elements being operable to hold the absorber part (2) on the outside of the cooling box (22).

10. An absorption refrigerating unit in accordance with claim 1, wherein the heating element (7) the connecting line (4) each protrude from the end of the casing.

11. An absorption refrigerating unit in accordance with claim 1, wherein the free end of the pipe (7) has a closable filling connection (10, 11).

12. An absorption refrigerating unit for a refrigerator, comprising a heatable absorber part, a heating element, and an evaporator part, the absorber part being formed from a casing filled with a material capable of absorption, said material absorbing fluid at a normal temperature and releasing fluid upon warming and through which passes said heating element, said heating element being oriented essentially vertically and having a section for heating in a regeneration phase and at least partially for cooling in a cooling phase, an interior of the absorber part being connected with the evaporator part via a connecting line, the section of the heating element for heating in the regeneration phase, and at least partially for cooling in the cooling phase, protruding from the absorber part, wherein a free end of the heating element (7) is surrounded by a burner pipe (18) of greater diameter, said burner pipe being supported by heat guide ribs (19) on the heating element (7).

13. An absorption refrigerating unit in accordance with claim 12, wherein holes (36) of graduated size are provided in a wall of the burner pipe (18), and that the heating element (34) is supplied with oxygen essentially from the outside of the burner pipe.

14. An absorption refrigerating unit for a refrigerator, comprising a heatable absorber part, a heating element, and an evaporator part, the absorber part being formed from a casing filled with a material capable of absorption, said material absorbing fluid at a normal temperature and releasing fluid upon warming and through which passes said heating element, said heating element being oriented essentially vertically and having a section for heating in a regeneration phase and at least partially for cooling in a cooling phase, an interior of the absorber part being connected with the evaporator part via a connecting line, the section of the heating element for heating in the regeneration phase, and at least partially for cooling in the cooling phase, protruding from the absorber part, further comprising a box-shaped housing (46) open on its upper side and having a box wall and a box bottom, the casing being suspended within the housing such that it is held separated from the box wall and the box bottom by a centering arrangement (49) projecting opposite the box wall.

15. An absorption refrigerating unit in accordance with claim 14, wherein the heating element (45) is mounted under the casing (39) in the box-shaped housing (46).

16. An absorption refrigerating unit in accordance with claim 14, wherein air intake holes (47) and at least one ignition hole (48) for an ignitable heating element (45) are provided in a lower area of the box-shaped housing (46).

17. An absorption refrigerating unit in accordance with claim 14, wherein the centering arrangement comprises recesses (49) arranged in the housing wall, said casing (39) being held clamped between said recesses.

18. An absorption refrigerating unit in accordance with claim 30, wherein the free end (78) of the heating element (77) is widened and is spherical in shape, for receiving radiation heat.

19. An absorption refrigerating unit in accordance with claim 1, further comprising heat guide devices (25), said heat guide devices including heat guide plates concentrically surrounding the heating casing and disposed in the material capable of absorption.

20. An absorption refrigerating unit in accordance with claim 19, wherein the heat guide plates (25) form a heat bridge between the heating element (7) and the cylindrical casing (2).

21. An absorption refrigerating unit for a refrigerator, comprising a heatable absorber part, a heating element, and an evaporator part, the absorber part being formed from a casing filled with a material capable of absorption, said material absorbing fluid at a normal temperature and releasing fluid upon warming and through which passes said heating element, said heating element being oriented essentially vertically and having a section for heating in a regeneration phase and at least partially for cooling in a cooling phase, an interior of the absorber part being connected with the evaporator part via a connecting line, the section of the heating element for heating in the regeneration phase, and at least partially for cooling in the cooling phase, protruding from the absorber part, the casing being cylindrical, essentially upright, and closed on all sides, wherein the connecting line (4) between the absorber part (2) and the evaporator part (3) is formed by a pipe which is located on the side of the cylinder with its axis parallel to the heating element (7), said pipe having openings for the passage of the liquid capable of absorption and which can be closed on the evaporator side by a valve (27).

22. An absorption refrigerating device in accordance with claim 21, wherein the valve (27) is biased toward its closed state by a valve activation device.

23. An absorption refrigerating unit in accordance with claim 22, wherein the valve (27) is opened by vapor pressure generated during the regeneration phase against the bias of the valve actuation device, in particular against the force of the ambient air pressure.

24. An absorption refrigerating unit in accordance with claim 23, wherein the valve actuation device (29) is formed by a stainless steel bellows, one side of said bellows being acted upon by pressure prevailing in the connection line (4) and the other side by the pressure of air surrounding the evaporator.

25. An absorption refrigerating unit in accordance with claim 21, wherein the valve (27) is adjustable by hand. for the cylindrical casing and the evaporator (40), said regeneration device having a heat-insulated housing part (63) for the cylindrical casing and a coolable housing part (64) for the evaporator.

26. An absorption refrigerating unit in accordance with claim 1, wherein a bore (30) passes through the evaporator part (3, 82) parallel to an axis of said evaporator part and increases the surface of the evaporator part.

27. An absorption refrigerating unit for a refrigerator, comprising a heatable absorber part, a heating element, and an evaporator part, the absorber part being formed from a casing filled with a material capable of absorption, said material absorbing fluid at a normal temperature and releasing fluid upon warming and through which passes said heating element, said heating element being oriented essentially vertically and having a section for heating in a regeneration phase and at least partially for cooling in a cooling phase, an interior of the absorber part being connected with the evaporator part via a connecting line, the section of the heating element for heating in the regeneration phase, and at least partially for cooling in the cooling phase, protruding from the absorber part, further comprising a regeneration device (62) for the casing and the evaporator (40), said regeneration device having a heat-insulated housing part (63) for the casing and a coolable housing part (64) for the evaporator.

28. An absorption refrigerating unit in accordance with claim 27, wherein the lower end of the heat-insulated housing part (68) has the heating element (67).

29. An absorption refrigerating unit in accordance with claim 27, wherein the coolable housing part (64) can be filled with a cooling agent surrounding the evaporator.

30. An absorption refrigerating for a refrigerator, comprising a heatable absorber part, a heating element, and an evaporator part, the absorber part being formed from a casing (2) filled with a material capable of absorption, said material absorbing fluid at a normal temperature and releasing fluid upon warming and through which passes said heating element (7), said heating element being a closed pipe oriented essentially vertically and centrally within said absorber part and extending over a length of the absorber part, said heating element being evacuated and partially filled with a liquid, an interior of the absorber part being connected with the evaporator part (8) via a connecting line (4), wherein the casing (72) is surrounded by a closed housing (73) on its outside and a hollow space between the casing (72) and the housing (73) is filled with a cooling medium (74), said heating element having a free end protruding from said casing and said closed housing effective for heating in a regeneration phase and at least partially cooling in a cooling phase.

31. An absorption refrigerating unit in accordance with claim 30, wherein the housing (73) is connected with a supply tank (75) for receiving the cooling medium (74).

32. An absorption refrigerating unit in accordance with claim 31, wherein the supply tank (75) is located on the housing (73) such that the cooling medium (74) escapes from the housing into the supply tank due to gravity, and flows from the supply tank into the housing in the active cooling phase.

33. An absorption refrigerating unit in accordance with claim 30, wherein cooling ribs (84, 85) are located on at least one of the outside of the housing (73) and the supply tank (75).

34. An absorption refrigerating unit in accordance with claim 33, wherein the cooling ribs (84, 85) are hollow and the cooling medium (74) flows through the cooling ribs.

35. An absorption refrigerating unit in accordance with claim 1, wherein the heating element is a burner operating with a solid, liquid, or gaseous fuel.

36. An absorption refrigerating unit in accordance with claim 1, wherein the heating element is operated with solar energy and has an adjustable parabolic mirror on the section of the heating element projecting from the absorber part.

* * * * *

UNITED STATES PATENT AND TRADEMARK OFFICE
CERTIFICATE OF CORRECTION

PATENT NO. : 5,816,069
DATED : October 6, 1998
INVENTOR(S) : Ebbeson

It is certified that error appears in the above-identified patent and that said Letters Patent is hereby corrected as shown below:

On the title page, item [30], Foreign Application Priority Data, delete "44 32 4281.6" and insert --44 32 428.6--.

On the title page, item [56], References Cited, please add
-- FOREIGN REFERENCES
1,018,022    12/1952    France
2,623,899    6/1989     France    --.

Column 14, Lines 29-33, delete "for the cylindrical casing and the evaporator (40), said regeneration device having a heat-insulated housing part (63) for the cylindrical casing and a coolable housing part (64) for the evaporator.".

Signed and Sealed this

Sixteenth Day of March, 1999

Attest:

Q. TODD DICKINSON

*Attesting Officer*    *Acting Commissioner of Patents and Trademarks*